United States Patent Office 2,828,215
Patented Mar. 25, 1958

2,828,215
LINOLEUM CEMENTS

Lawrence H. Dunlap, Lancaster Township, Lancaster County, Pa., assignor to Armstrong Cork Company, Lancaster, Pa., a corporation of Pennsylvania No Drawing. Application November 30, 1951
Serial No. 259,311

3 Claims. (Cl. 106—219)

This application is a continuation-in-part of my copending application Serial No. 81,632, filed March 15, 1949, and now abandoned.

This invention relates to linoleum compositions. More particularly, the invention relates to a linoleum cement comprising a resinous material and a fraction of tall oil which is substantially completely free from saturated fatty acids.

Linoleum cements have been made for a number of years from a drying oil and a resin by a number of methods which result in the production of a siccative oil-resin gel by oxidizing and polymerizing the drying oil generally in the presence of the resinous material. Ordinarily, linoleum cements comprise about 65% to 85% drying oil and about 15% to 35% resin. For many years linoleum cements were manufactured from a resin such as rosin and a siccative oil such as a drying oil, for example linseed oil, and a semi-drying oil, for example soya bean oil. However, recently other materials have been proposed for use in place of a portion or all of the drying oil component of the linoleum cement. For example, tall oil has been so proposed.

Tall oil is a by-product of the manufacture of kraft paper by the sulfate process from pine or fir wood and is generally considered to be a mixture of fatty acids, rosin acids, and unsaponifiable materials. Generally speaking, a typical crude tall oil contains about 35% to 50% rosin acids, about 40% to 50% fatty acids, and about 5% to 10% sterols. Of the fatty acid fraction, saturated fatty acids may comprise about 6% to 8% of the total, oleic acid about 44% to 52%, and linoleic acid about 45% to 50%.

Linoleum cements containing substantial quantities of tall oil have been prepared and successfully employed in the manufacture of linoleum compositions. These compositions may be employed in the preparation of floor or wall coverings which have generally the flexibility and resilience found in linoleum which is prepared from a siccative oil-resin gel produced by the oxidation and polymerization of a drying oil such as linseed oil and a resin such as rosin.

Generally speaking, however, tall oil-containing cements are somewhat more thermoplastic than ordinary linoleum cements; and floor coverings manufactured from compositions containing such cements may soften at elevated temperatures, thereby resulting in excessive indentation and a fairly high degree of dirt retention. Thus, these floor coverings may be adversely affected in warm climates or under extreme summer conditions.

It has been found that tall oil may be treated in such a manner as to obtain therefrom a fraction which is substantially completely free from saturated fatty acids.

I have found that linoleum cements may be prepared containing the fraction of tall oil which is substantially completely free from saturated fatty acids and that these cements exhibit improved resistance to indentation under conditions of elevated temperatures such as are normally encountered in the warmest of climates.

The production of the saturated fatty-acid-free fraction of tall oil is described in application Serial No. 81,608, filed March 15, 1949, by L. H. Dunlap and C. F. Sievert, now U. S. Patent 2,565,484 and copending with my above-identified copending application. In accordance with the invention described and claimed in said copending application, tall oil is first subjected to oxidizing conditions until the viscosity of the material is between about 15 seconds and 250 seconds as measured in Gardner-Holdt bubble tubes. The normal increase in refractive index of the tall oil when subjected to such oxidation procedure is about .0040. When so oxidized, the tall oil is then subjected to solvent extraction by means of nonpolar solvents or by means of both nonpolar solvents and polar solvents to obtain a fraction containing oxidized unsaturated fatty acids and which is substantially completely free from saturated fatty acids.

More particularly, as described in said copending application, the oxidation of the tall oil may be carried out in any suitable oxidizing equipment, and the conditions of oxidation may vary depending upon the particular extraction system to be used. Advantageous results may be obtained by passing air through the tall oil while maintaining an elevated temperature of about 60° C. to about 150° C. Particularly advantageous results may be obtained at temperatures of between about 70° C. to about 100° C. The most advantageous manner of determining the degree of oxidation to be desired is by measuring the viscosity of the material subjected to oxidizing conditions. The fraction of tall oil which is oxidized is comprised essentially of the unsaturated components of the original tall oil; namely, those which contain carbon to carbon double bonds. The principal constituents of the oxidized fraction are those components of the original tall oil which contain two or more such double bonds per molecule.

In accordance with one embodiment of the invention disclosed and claimed in the above-mentioned copending application, the oxidized tall oil is mixed with a nonpolar solvent. While any of the well-known nonpolar hydrocarbon solvents such as the higher boiling aliphatic hydrocarbons, for example a mixed octane fraction, aromatic hydrocarbons, for example benzene, toluene, xylene, and commercial mixtures of straight chain and aromatic hydrocarbons may be used, the desired results have been obtained by means of a petroleum naphtha. Generally speaking, higher boiling solvents such as those boiling between about 150° F. to about 300° F. are preferred as these may be easily removed from their extracts.

In another embodiment of the invention disclosed in said copending application, the oxidized tall oil is dissolved in a polar solvent and thereafter extracted with a nonpolar solvent. In this embodiment of that invention, a wide variety of polar solvents may be employed. The polar solvents may contain a hydroxyl group, such as methyl alcohol, ethylene glycol, propylene glycol, and glycerine. They may contain hydroxy esters, such as beta-hydroxy ethyl acetate. They may contain a carboxyl group such as formic acid and acetic acid. They may contain an aldehyde group such as benzaldehyde. They may contain a carbonyl group such as acetone. They may be ethers, for example dimethoxy tetraglycol.

When the oxidized tall oil is first dissolved in a polar solvent and then extracted with nonpolar solvent, the polar solvent fraction is then freed of solvent and the resulting material is substantially completely free of saturated fatty acids.

In still a third embodiment of the invention disclosed in said copending application, the fractionation of the oxidized tall oil may be carried out by partition chromatographic separation. In accordance with this particular embodiment of that invention, a suitable column is provided and charged with an adsorbent material such as finely divided dehydrated silica which has been impregnated with an equal weight of polar solvent and then mixed into a slurry with nonpolar solvent which had been previously saturated with polar solvent. This slurry is charged to the column, and the adsorbent and nonpolar solvent separate to obtain the desired partition column. When the nonpolar solvent has settled to the level of the adsorbent, a mixture of oxidized tall oil and nonpolar solvent is added. When the tall oil has passed down to the level of the adsorbent, more nonpolar solvent is added to develop the column. Generally speaking, three bands develop within the column. The first band passes through the column rapidly and is collected at the discharge end. The column may then be broken up to separate the two remaining bands and each is eluted from the adsorbent by means of a suitable solvent such as acetone or other low boiling oxygen-containing solvents. The resulting fractions include a partially oxidized unsaturated fatty acid and resin acid fraction which is substantially completely free of saturated fatty acids and sterols.

In the practice of my invention tall oil fractions which are substantially completely free from saturated fatty acids and which are advantageously obtained in accordance with the above-mentioned application may be admixed with rosin or other resins generally utilized in the manfacture of linoleum cement, for example, copal, kauri gum, congo gum, other naturally occurring resins, and synthetic resins, such as urea formaldehyde resins, phenol formaldehyde resins, resinous petroleum derivatives, such as still residues from refining of petroleum fractions and the like, and any drying or semi-drying oil commonly employed in the manufacture of such cements, and the resulting mixture may be oxidized in conventional cement-making equipment to produce a highly desirable binder which can be compounded with other ingredients to produce linoleum compositions in the conventional manner. I have obtained particularly advantageous results by subjecting to oxidation conditions a mixture containing about 10% to 30% by weight of an extract as defined hereinabove, about 13% to 21% by weight of a natural resin such as rosin, and about 57% to 69% by weight of a drying or semi-drying oil. When less than 10% by weight of the oxidized tall oil fraction is employed, no significant improvement can be noted over the compositions containing crude tall oil. When more than 30% by weight of the oxidized fraction is utilized, linoleum made from compositions containing the cement tends to be tacky and is less resistant to soiling. In addition, heavy gauge linoleums lack resistance to indentation particularly at elevated temperatures.

Generally speaking, conventional conditions of cement preparation are followed in preparing the cements of my invention. For instance, the mixture is charged to a mechanical oxidizer and blown with air while being agitated at a temperature between about 160° F. and 240° F. The material is subjected to these conditions for a period of about 24 hours or more.

In order to more fully understand my invention reference may be had to the following specific examples which are given by way of illustration and not by way of limitation.

*Example I*

A linoleum cement was prepared by mechanically oxidizing for about 21 hours a mixture containing the following ingredients in the following proportions by weight:

| | Parts by weight |
|---|---|
| Saturated fatty acid free fraction of oxidized tall oil | 50 |
| Rosin | 105 |
| Linseed oil | 345 |
| Manganese and lead driers | 1.016 |

*Example II*

A desirable linoleum cement was prepared by mechanically oxidizing for about 26 hours a mixture containing the following ingredients in the following proportions:

| | Parts by weight |
|---|---|
| Saturated fatty acid free fraction of oxidized tall oil | 150 |
| Rosin | 65 |
| Linseed oil | 285 |
| Manganese and lead driers | 1.016 |

Cements prepared in accordance with my invention may be compounded with conventional fillers such as cork, wood flour, and the like, and various pigments to produce very desirable linoleum compositions.

A typical linoleum composition is as follows:

| | Parts by weight |
|---|---|
| Wood flour | 73 |
| Whiting | 117 |
| Cement | 112 |

Such linoleum compositions have been calendered into sheets and the sheets were cured and evaluated with respect to their property of indentation resistance at 77° F. and 115° F. The average percent change in the percent indentation of samples made in accordance with my invention was 44.2%. The average percent change in the percent indentation of samples made from crude tall oil was 49.2%. The average percent change in the percent of indentation of a typical linoleum cement made from linseed oil and rosin was about 45%. These figures indicate that linoleum cements made in accordance with my invention are equal to or better than conventional cements and are significantly superior to linoleum cements made from crude tall oil. In addition to the improvement in resistance to indentation the material is characterized by good resiliency and flexibility, which property is highly important as a hard surface floor covering.

As used herein, the term "siccative oil" or its equivalent is intended to include drying oils and semi-drying oils.

While I have described my invention with reference to certain particular embodiments and with reference to certain specific examples, it is to be understood that the invention is not limited thereby. Therefore, changes, omissions, substitutions and/or additions may be made without departing from the spirit of the invention as defined in the appended claims which are intended to be limited only as required by the prior art.

I claim:

1. A composition of matter suitable for use in the manufacture of linoleum cements by oxidation at a temperature of about 160 F. to about 240° F. and comprising about 10% to 30% by weight of an oxidized fraction of tall oil which is comprised essentially of the oxidized unsaturated components of tall oil and which is substantially completely free from saturated fatty acids and which has a viscosity between about 15 seconds and 250 seconds, about 13% to 21% by weight of rosin, and about 57% to 69% by weight of a siccative fatty oil.

2. A linoleum cement comprised essentially of the product obtained by mechanically oxidizing at a temperature of about 160° F. to about 240° F. a mixture containing about 10% to 30% by weight of an oxidized tall oil fraction which is comprised essentially of the oxidized unsaturated components of tall oil and which is substantially completely free from saturated fatty acids and which has a viscosity between about 15 seconds and 250 seconds, about 13% to 21% by weight of rosin, and about 57% to 69% by weight of linseed oil.

3. A linoleum composition comprising a filler and a binder obtained by mechanically oxidizing at a temperature of about 160° F. to about 240 F. a mixture including about 10% to 30% by weight of an oxidized fraction of tall oil which is comprised essentially of the oxidized unsaturated components of tall oil and which is substantially completely free from saturated fatty acids and which has a viscosity between about 15 seconds and 250 seconds, about 13% to 21% by weight of rosin, and about 57% to 69% by weight of a siccative fatty oil.

References Cited in the file of this patent
UNITED STATES PATENTS

| | | |
|---|---|---|
| 2,111,259 | Blengsli | Mar. 15, 1938 |
| 2,439,377 | Bare et al. | Apr. 13, 1948 |
| 2,565,484 | Dunlap et al. | Aug. 28, 1951 |
| 2,594,345 | Powers et al. | Apr. 29, 1952 |

OTHER REFERENCES

"Tall Oil—Its Origin, Composition, Processing and Uses in the Paint Industry," Hess, Paint Technology, August 1946, vol. XI, No. 128, pages 301, 303 and 304.

"Applications of Tall Oil in the Paint Industry," Hastings, American Paint Journal, October 1943, pages 46 and 48.